(12) United States Patent
Hirose et al.

(10) Patent No.: US 8,272,785 B2
(45) Date of Patent: Sep. 25, 2012

(54) BEARING MECHANISM HAVING SLIDING BEARING

(75) Inventors: Masahiko Hirose, Osaka (JP);
Yoshihide Ohara, Osaka (JP); Masaaki Hashimoto, Osaka (JP); Takahiro Tanaka, Osaka (JP); Hidetoshi Kaida, Kanagawa (JP); Eiji Oki, Kanagawa (JP)

(73) Assignees: Jtekt Corporation, Osaka-shi (JP);
Oiles Corporation, Tokyo (JP)

( * ) Notice: Subject to any disclaimer, the term of this patent is extended or adjusted under 35 U.S.C. 154(b) by 186 days.

(21) Appl. No.: 12/739,453

(22) PCT Filed: Oct. 21, 2008

(86) PCT No.: PCT/JP2008/002981
§ 371 (c)(1),
(2), (4) Date: Jun. 14, 2010

(87) PCT Pub. No.: WO2009/054122
PCT Pub. Date: Apr. 30, 2009

(65) Prior Publication Data
US 2010/0278467 A1  Nov. 4, 2010

(30) Foreign Application Priority Data

Oct. 23, 2007  (JP) .................................. 2007-275000

(51) Int. Cl.
*F16C 33/02* (2006.01)
*F16C 27/06* (2006.01)

(52) U.S. Cl. ......... 384/215; 384/220; 384/276; 384/296

(58) Field of Classification Search .................... 384/10, 384/20, 29, 215, 220, 275–276, 295–300, 384/428
See application file for complete search history.

(56) References Cited

U.S. PATENT DOCUMENTS

| | | | |
|---|---|---|---|
| 2,350,898 A * | 6/1944 | Jetter | 92/165 R |
| 4,208,075 A * | 6/1980 | Templeton | 384/29 |
| 6,485,180 B2 * | 11/2002 | Mena | 384/215 |
| 7,220,056 B2 * | 5/2007 | Kubota et al. | 384/276 |
| 2002/0085778 A1 * | 7/2002 | Mena | 384/276 |
| 2004/0076353 A1 | 4/2004 | Kubota et al. | |
| 2006/0117898 A1 * | 6/2006 | Schneider et al. | 74/492 |

FOREIGN PATENT DOCUMENTS

| JP | 2004-255988 | 9/2004 |
|---|---|---|
| JP | 2004-347105 | 12/2004 |
| JP | 2006-234152 | 9/2006 |
| JP | 2007-040429 | 2/2007 |
| JP | 2007-050762 | 3/2007 |

OTHER PUBLICATIONS

International Search Report for PCT/JP2008/002981, mailed Jan. 27, 2009.

* cited by examiner

*Primary Examiner* — Marcus Charles
(74) *Attorney, Agent, or Firm* — Nixon & Vanderhye P.C.

(57) ABSTRACT

A bearing mechanism 1 includes a housing 3 having a cylindrical inner peripheral surface 2, a rack shaft 5 inserted and secured in the housing 3 and having a cylindrical outer peripheral surface 4, and a sliding bearing 6 interposed between the inner peripheral surface 2 of the housing 3 and the outer peripheral surface 4 of the rack shaft 5.

4 Claims, 3 Drawing Sheets

BEARING MECHANISM HAVING SLIDING BEARING

CROSS REFERENCE TO RELATED APPLICATIONS

This application is the U.S. national phase of International Application No. PCT/JP2008/002981 filed 21 Oct. 2008, which designated the U.S. and claims priority to Japan Application No. 2007-275000 filed 23 Oct. 2007, the entire contents of each of which are hereby incorporated by reference.

TECHNICAL FIELD

The present invention relates to a bearing mechanism having a sliding bearing interposed between, for example, a rack shaft and a housing so as to linearly movably support the rack shaft of an automobile.

BACKGROUND ART

[Patent Document 1] JP-A-2004-347105

A sliding bearing formed of a synthetic resin is used as a rack shaft bearing for linearly movably supporting a rack shaft for steering an automobile.

DISCLOSURE OF THE INVENTION

Problems that the Invention is to Solve

The sliding bearing has advantages in that, as compared with a rolling bearing, the sliding bearing is low in cost and excels in the vibration absorbing characteristic. Nevertheless, there is a problem in that since an appropriate clearance (bearing clearance) is required between the sliding bearing and the rack shaft, collision noise occurs between the rack shaft and the bearing, and is transmitted to the driver of the automobile as unpleasant sound. If the clearance between the sliding bearing and the rack shaft is made small to suppress the occurrence of this collision noise, the frictional torque increases, and the difference in frictional torque between at the time of a linear motion start and during linear motion becomes large. At the same time, the small clearance constitutes a factor hampering the stability in frictional torque, such as the occurrence of variations in frictional torque during linear motion due to a stick-slip phenomenon or the like caused by dimensional variations in the outside diameter of the rack shaft.

In addition, although the rack shaft is linearly movably supported by a housing by means of the sliding bearing, the roundness of the inside diameter of the housing is normally not very high. If the sliding bearing made of a synthetic resin is press fitted and fixed into such a housing, the sliding bearing is strained by being affected by the roundness of the inside diameter of the housing, producing a difference in the clearance with the rack shaft. This also hampers the stability of the frictional torque.

Patent Document 1 proposes a sliding bearing and a bearing mechanism having the bearing, which make it possible to eliminate the noise of collision with the rack shaft, reduce the linear-motion frictional resistance, make small the difference in the linear-motion frictional resistance between at the time of a linear motion start and during linear motion, and obtain stable linear-motion frictional resistance without being affected by such as dimensional variations in the outside diameter of the rack shaft and the roundness of the inside diameter of the housing, thereby making it possible to support the rack shaft smoothly and effect the linear motion of the rack shaft more smoothly.

With this bearing mechanism, the sliding bearing is retained by the housing so that the sliding bearing does not come off the housing in the axial direction. However, in cases such as where while a groove is provided in the housing, a collar (pawl) is provided on the sliding bearing to allow the collar to be fitted to the groove to thereby effect retention for preventing the coming off, a clearance (gap) is present between the collar and the housing in the groove for enabling the fitting of the collar to the groove. If such a clearance (gap) is present, in a case where the static frictional resistance between the sliding bearing and the rack shaft is greater than the static frictional resistance between the sliding bearing and the housing due to the effect of a lubricant such as grease applied, at the time of the start of the linear motion of the rack shaft the sliding bearing is linearly moved together with the rack shaft with respect to the housing by the portion of the clearance, and the rack shaft is subsequently linearly moved with respect to the sliding bearing. Hence, there is a possibility that the steering feel at the steering wheel can be impaired due to the difference between the two frictional resistances.

In addition, the bearing mechanism for the rack shaft also has a function of ensuring that microvibrations applied to the rack shaft from the wheels during traveling on the road surface are not transmitted to the steering wheel (flutter suppression effect). However, with the bearing mechanism in which the above-described clearance (gap) is present, the sliding bearing itself vibrates together with the vibration of the rack shaft, possibly making it impossible to sufficiently obtain the flutter suppression effect.

BRIEF SUMMARY OF THE INVENTION

The present invention has been devised in view of the above-described aspects, and its object is to provide a bearing mechanism which makes it possible to eliminate the noise of collision with the rack shaft, reduce the linear-motion frictional resistance, make small the difference in the linear-motion frictional resistance between at the time of a linear motion start and during linear motion, and obtain stable linear-motion frictional resistance without being affected by such as dimensional variations in the outside diameter of the rack shaft and the roundness of the inside diameter of the housing, thereby making it possible to support the rack shaft smoothly, effect the linear motion of the rack shaft more smoothly, improve the steering feel at the steering wheel, and maintain the flutter suppression effect sufficiently.

A bearing mechanism in accordance with the present invention comprises: a housing having a cylindrical inner peripheral surface, a rack shaft inserted and secured in the housing and having a cylindrical outer peripheral surface, and a sliding bearing interposed between the inner peripheral surface of the housing and the outer peripheral surface of the rack shaft. Here, the housing has a retaining groove in an inner peripheral surface thereof, and the sliding bearing includes: a cylindrical bearing body; one slit provided in the bearing body and extending from one axial end face of the bearing body toward another axial end face of the bearing body; another slit provided in the bearing body and extending from the other axial end face of the bearing body toward the one axial end face of the bearing body; a plurality of sliding surfaces provided on an inner side of the bearing body and at least partially spaced apart from each other in a direction about an axis; at least one fitting groove provided in an outer surface of the bearing body; an elastic ring which is fitted in the fitting groove in such a manner as to project radially from the outer surface of the bearing body and to reduce a diameter of the bearing body; and restricting means which is disposed in the retaining groove of the housing with an elastic interference and elastically restricts the axial movement of the bearing body with respect to the housing. The elastic ring is fitted at an outer peripheral surface thereof to the housing with an interference. The bearing body is fitted on the outer peripheral surface of the rack shaft by tightening the rack shaft with the resiliency of the elastic ring by means of the sliding surfaces. The restricting means includes a projection which is integrally formed on the outer peripheral surface of the bearing body in such a manner as to project radially outward toward the retaining groove and another elastic ring fitted on the projection by surrounding the projection. The retaining groove is defined by a pair of wall surfaces perpendicular to an axial direction of the housing and a wall surface extending in a direction about an axis of the housing. The other elastic ring is elastically compressed by being brought into contact with the pair of wall surfaces defining the retaining groove.

According to the bearing mechanism in accordance with the present invention, when the bearing body is inserted onto the inner peripheral surface of the housing, the elastic ring projecting from the outer peripheral surface of the bearing body undergoes elastic deformation with an interference with respect to the inner peripheral surface of the housing. This elastic deformation makes it possible to absorb dimensional variations of the housing in such as the roundness of its inside diameter. In addition, according to such a bearing mechanism, the bearing body, whose diameter is capable of being freely reduced by the slits each having an open end at each end face of the bearing body, is made to undergo reduction in diameter by the elastic ring and tightens by means of the plurality of sliding surfaces the rack shaft inserted therein. Therefore, the clearance with the rack shaft can be set to zero, thereby making it possible to eliminate the collision with the rack shaft. As a result, it is possible to prevent the occurrence of the collision noise which is transmitted as unpleasant sound. In addition, it is possible to make small the difference in the linear-motion frictional resistance between at the time of a linear motion start and during linear motion, and obtain stable linear-motion frictional resistance by absorbing dimensional variations in the outside diameter of the rack shaft.

Further, according to the bearing mechanism in accordance with the present invention, because the restricting means is disposed in the retaining groove of the housing with an elastic interference and elastically restricts the axial movement of the bearing body with respect to the housing, even in a case where the static frictional resistance between the sliding bearing and the rack shaft is greater than the static frictional resistance between the sliding bearing and the housing, it is possible to elastically prevent the sliding bearing at the time of the start of linear motion of the rack shaft from being moved linearly in the axial direction together with the rack shaft with respect to the housing, thereby allowing the sliding bearing to be held with respect to the housing. Hence, even at the start of the linear motion of the rack shaft, the rack shaft is linearly moved in the axial direction with respect to the sliding bearing in the same way as during its linear motion, so that the steering feel at the steering wheel can be improved, and the flutter suppression effect can be maintained sufficiently. Moreover, since the restricting means includes a projection which is integrally formed on the outer peripheral surface of the bearing body in such a manner as to project radially outward toward the retaining groove and another elastic ring fitted on the projection by surrounding the projection, and the other elastic ring is elastically compressed by being brought into contact with the pair of wall surfaces defining the retaining groove, it is possible to prevent the unidirectional effectiveness of the aforementioned effect in the axial direction of the bearing body, and it is thus possible to expect an equivalent effect in the linear motion of the rack shaft in both directions.

The projection of the restricting means may be singular, but is preferably plural. In the case where two projections are provided in the restricting means, these projections may be arranged axisymmetrically, and in the case where three or more projections are provided, these three or more projections may be arranged at equal central angles in the direction about the axis. The retaining groove may be a single annular groove provided over the entire circumference of the inner peripheral surface of the housing, but may alternatively be a singular groove or plural grooves provided in correspondence with the projection(s) of the restricting means.

The projection of the restricting means may be formed in the shape of a column, an elliptic column, a truncated cone, a prism, a hollow cylinder, a hollow elliptic cylinder, a hollow truncated cone, or a hollow prism. Such a projection may be disposed in the retaining groove in the inner peripheral surface of the housing with an elastic interference based on the other elastic ring. In a preferred example, the projection of the restricting means has an annular groove for fitting the other elastic ring therein, the projection of the restricting means has an outer peripheral surface thereof disposed in the retaining groove with clearances with the pair of wall surfaces, respectively, and the other elastic ring partially projects from the annular groove in an axial direction, and is, at a partially projecting portion thereof, in contact with the pair of wall surfaces. The restricting means may have a projection with the other elastic ring not fitted thereon, in addition to the projection with the other elastic ring fitted thereon.

As the elastic ring fitted in the fitting groove, it is possible to cite as a preferred example an elastic ring whose outside diameter is approximately 0.3 to 1.0 mm greater than the diameter of the inner peripheral surface of the housing and whose inside diameter is approximately 0.3 mm to 1.0 mm smaller than the diameter of the bottom of the fitting groove, although the size of the elastic ring depends on its modulus of elasticity. In brief, it suffices if the elastic ring is adapted to have an interference with the inner peripheral surface of the housing, projects from the outer peripheral surface of the bearing body, and reduce the diameter of the bearing body to such an extent as to set the clearance between each sliding surface and the rack shaft to zero by tightening the rack shaft with appropriate resiliency by means of the plurality of sliding surfaces. Specifically, it suffices at least if the outside diameter of the elastic ring is greater than the diameter of the inner peripheral surface of the housing, and the inside diameter of the elastic ring is smaller than the diameter of the bottom of the groove.

Each of the elastic rings may be a so-called O-ring having a circular cross section, but may be a ring of other shapes, such as an X-shaped cross section, a U-shaped cross section, and a trapezoidal cross section. The elastic material for forming the elastic ring may be any one of natural rubber, synthetic rubber, and an elastic thermoplastic synthetic resin, e.g., a polyester elastomer.

A sliding bearing in accordance with the present invention which is interposed between a cylindrical inner peripheral surface having a retaining groove in a housing and a cylindrical outer peripheral surface of a rack shaft which is inserted and secured in the housing, comprises: a cylindrical bearing body; one slit provided in the bearing body and extending from one axial end face of the bearing body toward another axial end face of the bearing body; another slit provided in the bearing body and extending from the other axial end face of the bearing body toward the one axial end face of the bearing body; a plurality of sliding surfaces provided on an inner side of the bearing body and at least partially spaced apart from each other in a direction about an axis; at least one fitting groove provided in an outer surface of the bearing body; an elastic ring which is fitted in the fitting groove in such a manner as to project radially from the outer surface of the bearing body and to reduce a diameter of the bearing body; and restricting means which is adapted to be disposed in the retaining groove of the housing with an elastic interference and is adapted to elastically restrict the axial movement of the bearing body with respect to the housing. The elastic ring is adapted to be fitted at an outer peripheral surface thereof to the housing with an interference. The bearing body is adapted to be fitted on the outer peripheral surface of the rack shaft by tightening the rack shaft with the resiliency of the elastic ring by means of the sliding surfaces. The restricting means includes a projection which is integrally formed on the outer peripheral surface of the bearing body in such a manner as to project radially outward so as to be directed toward the retaining groove and another elastic ring fitted on the projection by surrounding the projection. The retaining groove is defined by a pair of wall surfaces perpendicular to an axial direction of the housing and a wall surface extending in a direction about an axis of the housing. The other elastic ring is adapted to be elastically compressed by being brought into contact with the pair of wall surfaces defining the retaining groove.

By using the sliding bearing in accordance with the present invention in the above-described bearing mechanism, it is possible to provide a bearing mechanism which makes it possible to support the rack shaft smoothly and effect the linear motion of the rack shaft more smoothly, and which makes it possible to improve the steering feel at the steering wheel and maintain the flutter suppression effect sufficiently.

In the present invention, each of the one and the other slits may be provided in plural numbers in the bearing body, each of the slits may extend through between a pair of sliding surfaces, and the one and the other slits may be arranged alternately in the direction about the axis. Each of the sliding surfaces may be provided on the inner side of the bearing body between positions each axially spaced apart a predetermined distance from each of the end faces of the bearing body, and the plurality of sliding surfaces may preferably be arranged at equal intervals in the direction about the axis. In a preferred example, at least two fitting grooves axially spaced apart from each other are provided in the outer peripheral surface of the bearing body, elastic rings are respectively fitted in the fitting grooves in such a manner as to project from the outer peripheral surface of the bearing body and to reduce the diameter of the bearing body, and an axially central portion of each of the sliding surfaces is located between the two fitting grooves in the axial direction. The sliding surfaces may be provided on the inner side of the bearing body between the two fitting grooves in the axial direction, or may be provided on the inner side of the bearing body by extending beyond the two fitting grooves in the axial direction.

The elastic ring which is fitted in the fitting groove may have a volume greater than a volumetric capacity of the fitting groove. It is not necessary for the elastic ring to be disposed in the fitting groove in close contact with the bearing body without a gap, and may be fitted in the fitting groove with a slight gap with respect to the bearing body. The elastic ring may be adapted to be deformed and fill the fitting groove completely in a case where the portion of the elastic ring projecting radially from the outer peripheral surface of the bearing body is properly pressed by the housing. Alternatively, an arrangement may be provided such that even in a case where the elastic ring is thus pressed properly by the housing, the elastic ring has a slight gap with respect to the bearing body, whereas in a case where the housing has been off-centered from a proper position with respect to the rack shaft due to an unintentional external force, and has been locally pressed strongly by the housing, the elastic ring is deformed at the excessively pressed portion and fills the fitting groove completely to increase the rigidity, thereby counteracting the unintentional off-center of the housing.

The sliding bearing is preferably arranged such that a clearance having a width of 0.3% to 10% of a radial maximum thickness of the bearing body at its portion constituting a free end portion of the bearing body with respect to the housing is preferably produced between the inner peripheral surface of the housing and the outer peripheral surface of the bearing body at the portion constituting the free end portion thereof. If the clearance is less than 0.3%, there is a possibility that the housing easily comes into contact with the bearing body to produce abnormal noise and the like in a case where the housing has been off-centered from a proper position with respect to the rack shaft due to an unintentional external force. If the clearance is greater than 10%, there is a possibility that the housing is easily off-centered greatly from a proper position with respect to the rack shaft due to an unintentional external force, causing a decline in the aligning effect based on the bearing mechanism. Accordingly, if the sliding bearing is constructed as described above, it is possible to avoid the contact of the housing with the bearing body, and the housing can be reliably held at a proper position with respect to the rack shaft.

In the present invention, each of the sliding surfaces may be a flat surface or an arcuate convex or concave surface. In the case where each of the sliding surfaces is a flat surface, the distance between the sliding surfaces radially opposing each other and parallel to each other may be smaller than the inside diameter of the bearing body at each of its end faces. Alternatively, in the case where each of the sliding surfaces is an arcuate convex surface, the distance between apices of the sliding surfaces radially opposing each other may be smaller than the inside diameter of the bearing body at each of its end faces. Still alternatively, in the case where each of the sliding surfaces is an arcuate concave surface, the distance between bottoms of the sliding surfaces radially opposing each other may be smaller than the inside diameter of the bearing body at each of its end faces.

In the case where each of the sliding surfaces is a flat surface, each sliding surface at its central portion in the direction about the axis may be adapted to tighten the rack shaft with the resiliency of the elastic ring. Alternatively, in the case where each of the sliding surfaces is an arcuate convex surface, each sliding surface at its apex may be adapted to tighten the rack shaft with the resiliency of the elastic ring. Still alternatively, in the case where each of the sliding surfaces is an arcuate concave surface, each sliding surface at its bottom may be adapted to tighten the rack shaft with the resiliency of the elastic ring. The arcuate concave surface may have a curvature smaller than that of the outer peripheral surface of the rack shaft or a curvature substantially equal thereto.

In a preferred example, the inner side of the bearing body may have one tapered surface extending and gradually reduced in diameter from the one end face of the bearing body to one axial end of the sliding surface and another tapered surface extending and gradually reduced in diameter from the other end face of the bearing body to the other axial end of the sliding surface. Here, the one tapered surface may have an axial length greater than that of the other tapered surface. In addition, the one tapered surface may have a cone angle greater than that of the other tapered surface. According to the sliding bearing having such tapered surfaces, the bearing body can be easily fitted to the outer peripheral surface of the rack shaft from the one tapered surface side, with the result that it is possible to substantially reduce the number of assembly steps.

In the bearing mechanism in accordance with the present invention, the plurality of sliding surfaces and the bearing body are integrally formed of a synthetic resin. As the synthetic resin for forming the plurality of sliding surfaces and the bearing body, it is possible to cite as a preferred example a thermoplastic synthetic resin such as polyacetal resin, polyimide resin, polyethylene resin, tetrafluoroethylene resin, or the like.

Advantages of the Invention

According to the present invention, it is possible to provide a bearing mechanism which makes it possible to eliminate the noise of collision with the rack shaft, reduce the linear-motion frictional resistance, make small the difference in the linear-motion frictional resistance between at the time of a linear motion start and during linear motion, and obtain stable linear-motion frictional resistance without being affected by such as dimensional variations in the outside diameter of the rack shaft and the roundness of the inside diameter of the housing, thereby making it possible to support the rack shaft smoothly, effect the linear motion of the rack shaft more smoothly, improve the steering feel at the steering wheel, and maintain the flutter suppression effect sufficiently.

Hereafter, a description will be given of the preferred embodiment of the invention with reference to the drawings. It should be noted that the present invention is not limited to the embodiment.

DESCRIPTION OF THE PREFERRED EMBODIMENT

Figure 1:
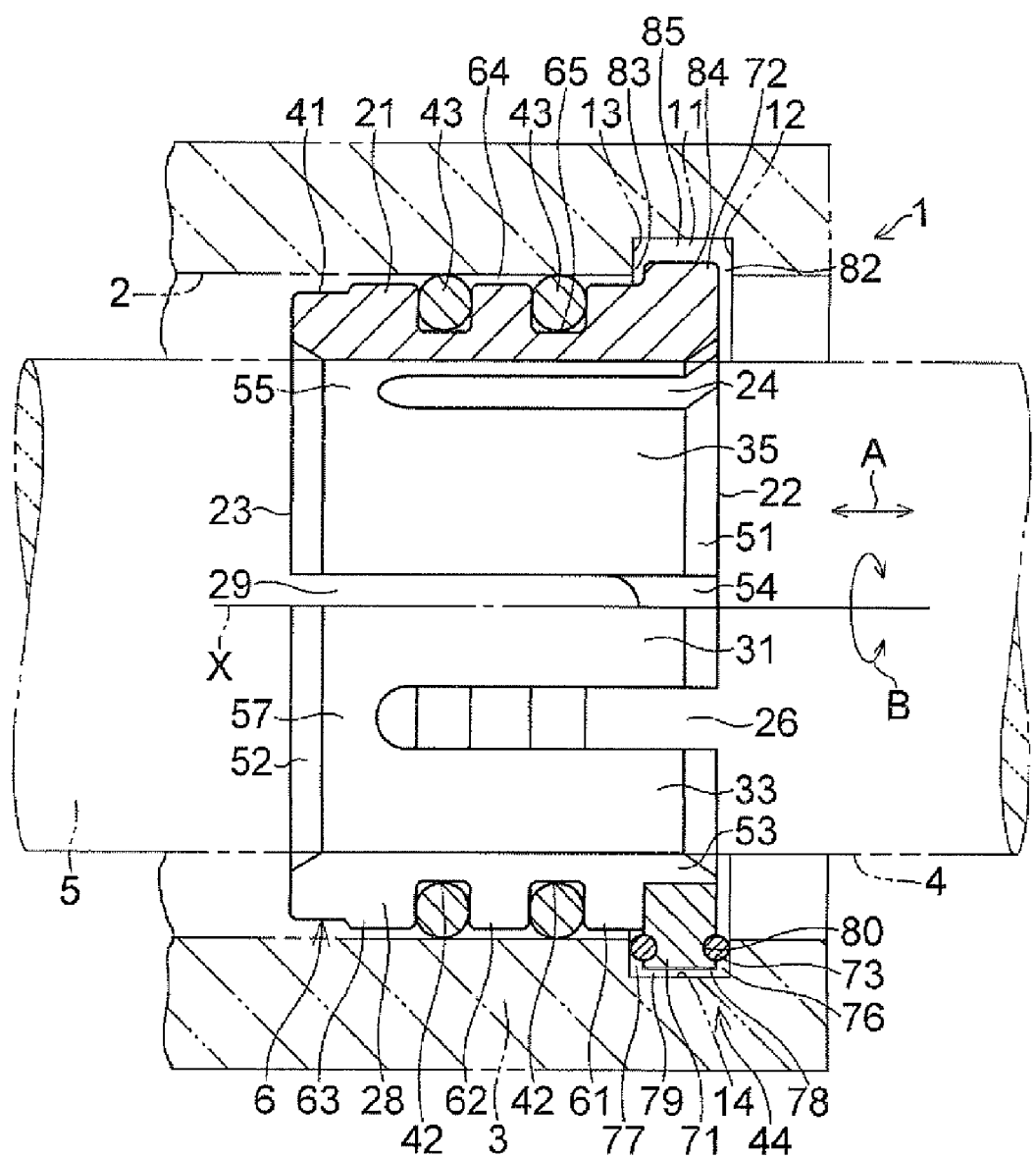
FIG. 1 is an explanatory view of a sliding bearing in accordance with a preferred embodiment of the invention and includes a cross section taken in the direction of arrows along line I-I shown in FIG. 3.
Figure 2:
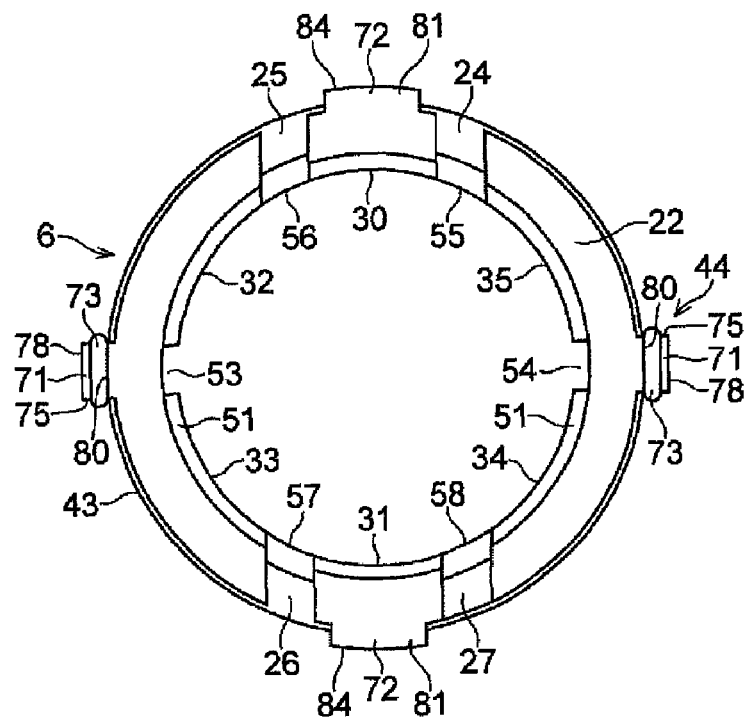
FIG. 2 is an explanatory right side view of the sliding bearing in the embodiment shown in FIG. 1.
Figure 3:
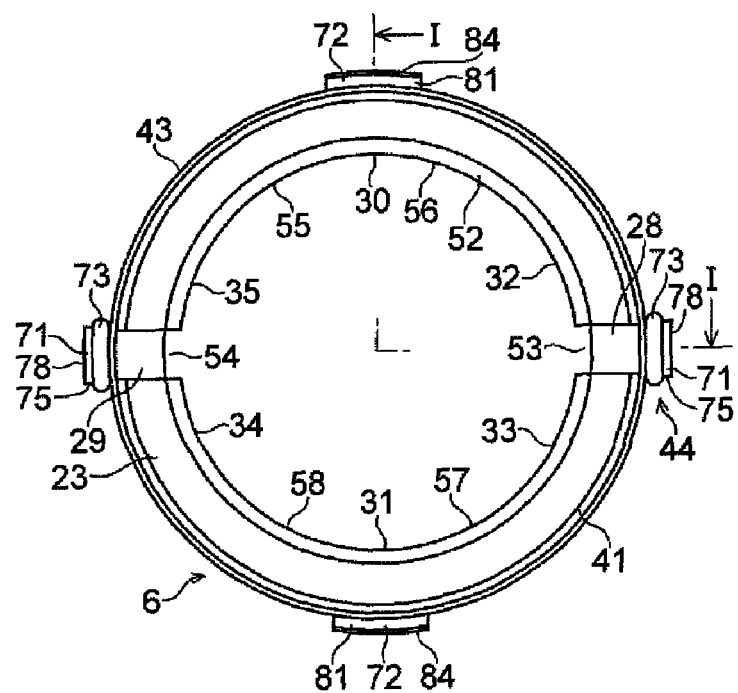
FIG. 3 is an explanatory left side view of the sliding bearing in the embodiment shown in FIG. 1.
Figure 4:
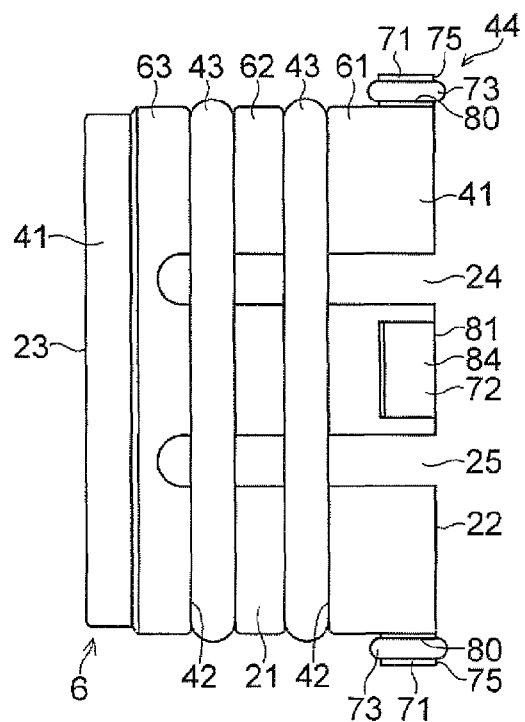
FIG. 4 is an explanatory plan view of the sliding bearing in the embodiment shown in FIG. 1.
Figure 5:
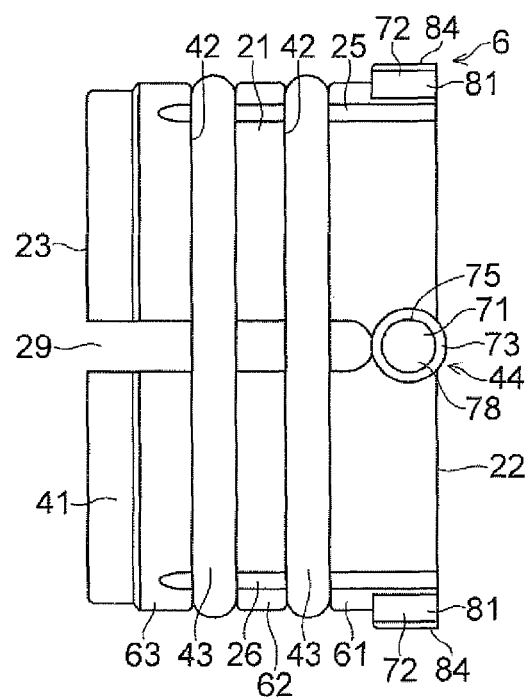
FIG. 5 is an explanatory bottom view of the sliding bearing in the embodiment shown in FIG. 1.

In FIGS. 1 to 5, a bearing mechanism 1 in accordance with this embodiment is comprised of a housing 3 having a cylindrical inner peripheral surface 2, a rack shaft 5 inserted and secured in the housing 3 and having a cylindrical outer peripheral surface 4, and a sliding bearing 6 interposed between the inner peripheral surface 2 of the housing 3 and the outer peripheral surface 4 of the rack shaft 5.

The housing 3 has an annular retaining groove 11 in its inner peripheral surface 2, and the retaining groove 11 is defined by a pair of annular wall surfaces 12 and 13 perpendicular to an axial direction A which is a direction along an axis X of the housing 3 and an annular wall surface 14 extending in a circumferential direction B which is a direction about the axis X of the housing 3.

The rack shaft 5 which is movable in the axial direction A is connected at one end to the steering wheel and at the other end to the wheels via connecting mechanisms, respectively, and since such connecting mechanisms are known, a description thereof will be omitted.

The sliding bearing 6 includes a cylindrical bearing body 21; a total of two pairs of slits 24 and 25 as well as 26 and 27 provided in the bearing body 21 in such a manner as to extend from one end face 22 in the axial direction A of the bearing body 21 toward another end face 23 of the bearing body 21; two slits 28 and 29 provided in the bearing body 21 in such a manner as to extend from the other end face 23 in the axial direction A of the bearing body 21 toward the one end face 22 of the bearing body 21; a plurality of, in this embodiment six, arcuate concave surfaces 30, 31, 32, 33, 34, and 35 serving as sliding surfaces which are provided on the inner side of the bearing body 21 and are partially spaced apart from each other in the circumferential direction B by the slits 24 to 29; at least one, in this embodiment two, fitting grooves 42 provided in an outer surface 41 of the bearing body 21; elastic rings 43 which are respectively fitted in the fitting grooves 42 in such a manner as to project from the outer surface 41 of the bearing body 21 and to reduce the diameter of the bearing body 21; and a restricting means 44 which is disposed in the retaining groove 11 of the housing 3 with an elastic interference and elastically restricts the movement in the axial direction A of the bearing body 21 with respect to the housing 3.

In the slits 24 to 27 which are open on the end face 22 side and extend beyond the fitting groove 42 on the end face 23 side in the axial direction A, one pair of slits 24 and 25 are arranged on both sides of the concave surface 30, while the other pair of slits 26 and 27, which are arranged symmetrically about the axis X with respect to the slits 24 and 25, are arranged on both sides of the concave surface 31 disposed symmetrically about the axis X with respect to the concave surface 30, i.e., at an angular interval of 180° therewith in the circumferential direction B.

The slits 28 and 29 which are open on the end face 23 side and extend beyond the fitting groove 42 on the end face 22 side in the axial direction A are arranged symmetrically about the axis X, i.e., at an angular interval of 180° with each other in the circumferential direction B, and are each arranged in a substantially central portion between the one pair of slits 24 and 25 and the other pair of slits 26 and 27 in the circumferential direction B.

The slits 24 to 27 may be singular, and the slits 28 and 29 may also be singular, but if they are arranged as in this embodiment, the shrinkage in diameter of the bearing body 21 can be uniformly and easily obtained, so that the arrangement of this embodiment is preferable.

The bearing body 21 including the concave surfaces 30 to 35 is integrally formed of a synthetic resin, e.g., a thermoplastic synthetic resin, such as polyacetal resin and polyamide resin.

In the concave surfaces 30 to 35 each having a substantially identical curvature to that of the outer peripheral surface 4 of the rack shaft 5, the concave surface 30 located between the one pair of mutually adjacent slits 24 and 25 and the concave surface 31 similarly located between the other pair of mutually adjacent slits 26 and 27 are arranged at an angular interval of 180° in the circumferential direction B, while the concave surfaces 32, 33, 34, and 35, which are respectively located between adjacent ones of the one pair of slits 24 and 25, the other pair of slits 26 and 27, and the slits 28 and 29 in the circumferential direction B, are arranged at equiangular intervals in the circumferential direction B. These concave surfaces 30 to 35 are provided between positions each spaced apart a predetermined distance from each of the both end faces 22 and 23 in the axial direction A of the bearing body 21 and on the inner side of the bearing body 21 beyond the two fitting grooves 42 in the axial direction A. Furthermore, respective central portions in the axial direction A of the concave surfaces 30 to 35 are located between the two fitting grooves 42 in the axial direction A.

The inner side of the bearing body 21 includes, in addition to the concave surfaces 30 to 35, a tapered surface 51 which extends and is gradually reduced in diameter from the end face 22 toward the end face 23 in the axial direction A; a tapered surface 52 which extends and is gradually reduced in diameter from the end face 23 toward the end face 22 in the axial direction A; air vent grooves 53 and 54 extending from the end face 22 in the axial direction A and respectively connected to one ends in the axial direction A of the slits 28 and 29; and arcuate connecting concave surfaces 55 and 56 as well as 57 and 58 serving as sliding surfaces extending from respective one ends in the axial direction A of the slits 24 to 27 to the tapered surface 52 and having an identical curvature to that of each of the arcuate concave surfaces 30 to 35. The concave surface 30 is connected to each of the concave surfaces 35 and 32 via each of the connecting concave surfaces 55 and 56 in the circumferential direction B, and the concave surface 31 is connected to each of the concave surfaces 33 and 34 via each of the connecting concave surfaces 57 and 58 in the circumferential direction B. The concave surfaces 32 and 33 are severed from each other by the slit 28 and the air vent groove 53 in the circumferential direction B, and the concave surfaces 34 and 35 are severed from each other by the slit 29 and the air vent groove 54 in the circumferential direction B.

The two fitting grooves 42 provided by being spaced apart from each other in the axial direction A in the outer surface 41 of the bearing body 21 are defined by three annular projections 61, 62, and 63 on the outer surface 41 side of the bearing body 21. The diameters of the projections 61, 62, and 63 at the outer surface 41 of the bearing body 21 are equal to each other, and yet are smaller than the diameter of the inner peripheral surface 2 of the housing 3, so that an annular gap (clearance) 64 is adapted to be produced between the outer surface 41 of the bearing body 21 at the projections 61, 62, and 63 and the inner peripheral surface 2 of the housing 3.

In a state in which each elastic ring 43 formed of an O-ring is not fitted to the inner peripheral surface 2 of the housing 3 but fitted in the fitting groove 42, the elastic ring 43 has an outside diameter greater than the diameter of the inner peripheral surface 2 of the housing 3. Further, in a state in which the elastic ring 43 is not fitted to the inner peripheral surface 2 of the housing 3 and not fitted in the fitting groove 42, the elastic ring 43 has an inside diameter smaller than the diameter of a bottom 65 of the fitting groove 42. As such, each elastic ring 43, which is fitted in the fitting groove 42 in such a manner as to project from the outer surface 41 of the bearing body 21 at the projections 61, 62, and 63 and to reduce the diameter of the bearing body 21, has a volume greater than the volumetric capacity of the fitting groove 42 into which it is fitted. Even if the elastic ring 43 is tightened and deformed and is filled in the fitting groove 42 without a gap, the elastic ring 43 is adapted to partially project from the outer surface 41.

Each elastic ring 43 is fitted at its outer peripheral surface to the inner peripheral surface 2 of the housing 3 with an interference. The bearing body 21 is disposed on the inner peripheral surface 2 of the housing 3 with the gap 64 between its outer surface 41 and the inner peripheral surface 2 of the housing 3. Further, the bearing body 21 is fitted on the outer peripheral surface 4 of the rack shaft 5 by tightening the rack shaft 5 with the resiliency of the elastic rings 43 by means of the concave surfaces 30 to 35 including the connecting concave surfaces 55 to 58.

The restricting means 44 includes two pairs of projections 71 and 72 which are integrally formed on the outer surface 41 of the bearing body 21 in such a manner as to project radially outward toward the retaining groove 11, as well as elastic rings 73 each fitted on the respective one of the pair of projections 71 by surrounding it.

The two projections 71 of the one pair, which are adjacent to the end face 22 and are disposed at positions corresponding to the air vent grooves 53 and 54, are arranged at an angular interval of 180° with each other in the circumferential direction B. The two projections 72 of the other pair, which are adjacent to the end face 22 and are disposed between the slits 24 and 25 and between the slits 26 and 27, respectively, are arranged at an angular interval of 180° with each other in the circumferential direction B. Thus, the projections 71 and 72, which are disposed in the retaining grooves 11 and are integrally formed with the bearing body 21, are arranged at equiangular intervals of 90° with each other in the circumferential direction B.

Each projection 71 having a columnar shape is disposed in the retaining groove 11 such that its cylindrical outer peripheral surface 75 has gaps 76 and 77 in the axial direction A with the pair of wall surfaces 12 and 13, respectively, and its distal end face 78 has a radial gap 79 greater than the radial gap 64 with the wall surface 14, an annular groove 80 being provided in its outer peripheral surface 75 for fitting the elastic ring 73 therein.

The elastic ring 73 fitted in each of the annular grooves 80 partially projects from the annular groove 80 in the axial direction A, and is elastically compressed by being brought, at its partially projecting portion, into contact with the pair of wall surfaces 12 and 13. Thus, each of the projections 71 of the restricting means 44 is disposed in the retaining groove 11 in the inner peripheral surface 2 of the housing 3 with the elastic interference based on the elastic rings 73.

Each of the projections 72 having the shape of a quadrangular column is disposed in the retaining groove 11 such that its flat outer peripheral surface 81 has gaps 82 and 83 in the axial direction A with the pair of wall surfaces 12 and 13, respectively, and its distal end face 84 has a radial gap 85 greater than the radial gap 64 with the wall surface 14.

The restricting means 44 is adapted to elastically restrict the movement in the axial direction A of the bearing body 21 with respect to the housing 3 by means of the projections 71 and the elastic rings 73 disposed in the annular grooves 80.

Each projection 72 may be fitted with an elastic ring 73 in the same way as the projection 71, in which case it suffices if an annular groove similar to the annular groove 80 is formed in the projection 72, and the elastic ring is then fitted in such an annular groove. In addition, the shape of the projection 72 is not limited to that of a quadrangular column and may be that of a cylindrical column. Similarly, the shape of the projection 71 is not limited to that of a cylindrical column and may be that of a quadrangular column. The pair of projections 71 each fitted with the elastic ring 73 are preferably arranged symmetrically about the X axis as in this embodiment; however, the projections 71 each fitted with the elastic ring 73 may be one or three or more in number. In the case where three or more projections 71 are provided, these three or more projections 71 may be arranged at equiangular intervals in the circumferential direction B with each other by omitting the projections 72.

With the above-described bearing mechanism 1, as the elastic rings 43 are respectively fitted in the fitting grooves 42 on the outer surface 41 of the bearing body 21, the bearing body 21 having the slits 24 to 29 undergo reduction in diameter by the elastic compressive force of the elastic rings 43, and the sliding bearing 6 with its bearing body 21 reduced in diameter is disposed within the housing 3. Subsequently, as the rack shaft 5 is inserted into the inner side of the bearing body 21, the bearing body 21 undergoes enlargement in diameter by means of the slits 24 to 29 against the elastic compressive force of the elastic rings 43, while the rack shaft 5 is tightened at its outer peripheral surface 4 by the concave surfaces 30 to 35 including the connecting concave surfaces 55 to 58 with the elastic compressive force of the elastic rings 43. Meanwhile, the elastic rings 43 are brought into contact with the inner peripheral surface 2 of the housing 3 with interferences at their outer peripheral surfaces. Moreover, the projection 71 and the elastic ring 73 are disposed in the retaining groove 11 without a gap in the axial direction A by virtue of the compressive deformation of the elastic ring 73 having an elastic interference.

Accordingly, the clearance between the outer peripheral surface 4 of the rack shaft 5 and each of the concave surfaces 30 to 35 including the connecting concave surfaces 55 to 58 becomes zero, thereby making it possible to eliminate the collision between the bearing body 21 and the rack shaft 5. Consequently, collision noise which is transmitted to a driver as unpleasant sound does not occur. In addition, since the elastic rings 43 fitted in the fitting grooves 42 of the bearing body 21 have an interference with respect to the inner peripheral surface 2 of the housing 3, the elastic rings 43 undergo elastic deformation, and are capable of absorbing dimensional variations of the housing 3 in such as the roundness of its inside diameter by virtue of the elastic deformation. Moreover, because the projections 71 and the elastic rings 73 of the restricting means 44 are disposed in the retaining groove 11 of the housing 3 with an elastic interference in the axial direction A, and elastically restrict the movement in the axial direction A of the bearing body 21 with respect to the housing 3, even in a case where the static frictional resistance between the outer peripheral surface 4 of the rack shaft 5 and the concave surfaces 30 to 35 including the connecting concave surfaces 55 to 58 of the sliding bearing 6 is greater than the static frictional resistance between the inner peripheral surface 2 of the housing 3 and the elastic rings 43, it is possible to elastically prevent the sliding bearing 6 at the time of the start of linear motion in the axial direction A of the rack shaft 5 from being moved linearly in the axial direction A together with the rack shaft 5 with respect to the housing 3, thereby allowing the sliding bearing 6 to be held with respect to the housing 3. Hence, even at the start of the linear motion of the rack shaft 5, the rack shaft 5 is linearly moved in the axial direction A with respect to the sliding bearing 6 in the same way as during its linear motion, so that the steering feel at the steering wheel can be improved, and the flutter suppression effect can be maintained sufficiently.

With the bearing mechanism 1, since the interior of the housing 3 and the exterior of the housing 3 can be communicated with each other via the slits 28 and 29 and the air vent grooves 53 and 54, it is possible to ensure the entry and exit of air outside the housing 3 with respect to the interior of the housing 3 in the movement in the axial direction A of the rack shaft 5.

Although, in the above, the sliding surfaces are constituted by the concave surfaces 30 to 35 including the connecting concave surfaces 55 to 58, the sliding surfaces may alternatively be constituted by arcuate convex surfaces or flat surfaces.

The invention claimed is:

1. A bearing mechanism comprising: a housing having a cylindrical inner peripheral surface, a rack shaft inserted and secured in said housing and having a cylindrical outer peripheral surface, and a sliding bearing interposed between the inner peripheral surface of said housing and the outer peripheral surface of said rack shaft,
wherein said housing has a retaining groove in an inner peripheral surface thereof, and said sliding bearing includes:
a cylindrical bearing body;
a first slit provided in said bearing body and extending from one axial end face of said bearing body toward another axial end face of said bearing body;
a second slit provided in said bearing body and extending from the other axial end face of said bearing body toward the one axial end face of said bearing body;
a plurality of sliding surfaces provided on an inner side of said bearing body and at least partially spaced apart from each other in a direction about an axis;
at least one fitting groove provided in an outer surface of said bearing body;
a first elastic ring which is fitted in said fitting groove so as to project radially from the outer surface of said bearing body and to reduce a diameter of said bearing body; and
restricting means which is disposed in said retaining groove of said housing with an elastic interference and elastically restricts the axial movement of said bearing body with respect to said housing,
said first elastic ring being fitted at an outer peripheral surface thereof to said housing with an interference,
said bearing body being fitted on the outer peripheral surface of said rack shaft by tightening said rack shaft with the resiliency of said first elastic ring by means of said sliding surfaces,
said restricting means including a projection which is integrally formed on the outer peripheral surface of said bearing body so as to project radially outward toward said retaining groove and a second elastic ring fitted on said projection by surrounding said projection,
said retaining groove being defined by a pair of wall surfaces of said housing perpendicular to an axial direction of said housing and a wall surface of said housing extending in a direction about an axis of said housing,
said second elastic ring being elastically compressed by the pair of wall surfaces of said housing and being brought into direct contact with the pair of wall surfaces of said housing.

2. The bearing mechanism according to claim 1, wherein said projection of said restricting means is disposed in said retaining groove in the inner peripheral surface of said housing with an elastic interference based on said second elastic ring.

3. The bearing mechanism according to claim 1, wherein said projection of said restricting means has an annular groove for fitting said second elastic ring therein, said projection of said restricting means has an outer peripheral surface thereof disposed in said retaining groove with clearances with the pair of wall surfaces of said housing, respectively, and said second elastic ring partially projects from the annular groove in an axial direction, and is, at a partially projecting portion thereof, in contact with the pair of wall surfaces of said housing.

4. A sliding bearing which is interposed between a cylindrical inner peripheral surface having a retaining groove in a housing and a cylindrical outer peripheral surface of a rack shaft which is inserted and secured in said housing, comprising:

a cylindrical bearing body;

a first slit provided in said bearing body and extending from one axial end face of said bearing body toward another axial end face of said bearing body;

a second slit provided in said bearing body and extending from the other axial end face of said bearing body toward the one axial end face of said bearing body;

a plurality of sliding surfaces provided on an inner side of said bearing body and at least partially spaced apart from each other in a direction about an axis;

at least one fitting groove provided in an outer surface of said bearing body;

a first elastic ring which is fitted in said fitting groove so as to project radially from the outer surface of said bearing body and to reduce a diameter of said bearing body; and restricting means which is adapted to be disposed in said retaining groove of said housing with an elastic interference and is adapted to elastically restrict the axial movement of said bearing body with respect to said housing, said first elastic ring being adapted to be fitted at an outer peripheral surface thereof to said housing with an interference, said bearing body being adapted to be fitted on the outer peripheral surface of said rack shaft by tightening said rack shaft with the resiliency of said first elastic ring by means of said sliding surfaces, said restricting means including a projection which is integrally formed on the outer peripheral surface of said bearing body so as to project radially outward so as to be directed toward said retaining groove and a second elastic ring fitted on said projection by surrounding said projection, said retaining groove being defined by a pair of wall surfaces of said housing perpendicular to an axial direction of said housing and a wall surface of said housing extending in a direction about an axis of said housing, said second elastic ring being adapted to be elastically compressed by the pair of wall surfaces of said housing and to be brought into direct contact with the pair of wall surfaces of said housing.

\* \* \* \* \*